United States Patent [19]

Galos

[11] 4,344,460

[45] Aug. 17, 1982

[54] APPARATUS FOR PLUGGING A PRESSURE PIPING SYSTEM

[75] Inventor: Imre Galos, Downers Grove, Ill.

[73] Assignee: Advance Valve Installations, Hinsdale, Ill.

[21] Appl. No.: 211,423

[22] Filed: Nov. 28, 1980

[51] Int. Cl.³ .............................................. F16L 55/10
[52] U.S. Cl. ...................................... 138/89; 220/327; 138/92; 138/94
[58] Field of Search ........................... 138/89, 92, 94; 285/403, 404; 277/126, 129; 70/208; 251/112; 220/323, 327, 328, 325, 326

[56] References Cited

U.S. PATENT DOCUMENTS

| | | | |
|---|---|---|---|
| 2,771,096 | 11/1956 | Ver Nooy | 138/89 |
| 3,350,104 | 10/1967 | Hynes | 277/129 X |
| 3,766,947 | 10/1973 | Osburn | 220/327 X |

Primary Examiner—James E. Bryant, III
Assistant Examiner—Daniel P. Stodola
Attorney, Agent, or Firm—Mason, Kolehmainen, Rathburn & Wyss

[57] ABSTRACT

An apparatus for plugging a pressure piping system includes one or more segments that may be positioned in the system to hold a plug therein. Each segment is held in position by a holding assembly including a plunger slideably mounted within the apparatus and actuable to move the segments to a position for engaging and locking the plug in place. A pin or similar member may be employed to affix the segment to the plunger, and an actuator is threadably mounted within the apparatus and used to adjust the position of the plunger. In the preferred embodiment, the actuator is coupled to the plunger by a threaded stud, with the threads of the actuator and of the stud being cut in opposite directions. The stud threadably engages the plunger such that rotation of the actuator activates the plunger toward and away from the segment.

23 Claims, 7 Drawing Figures

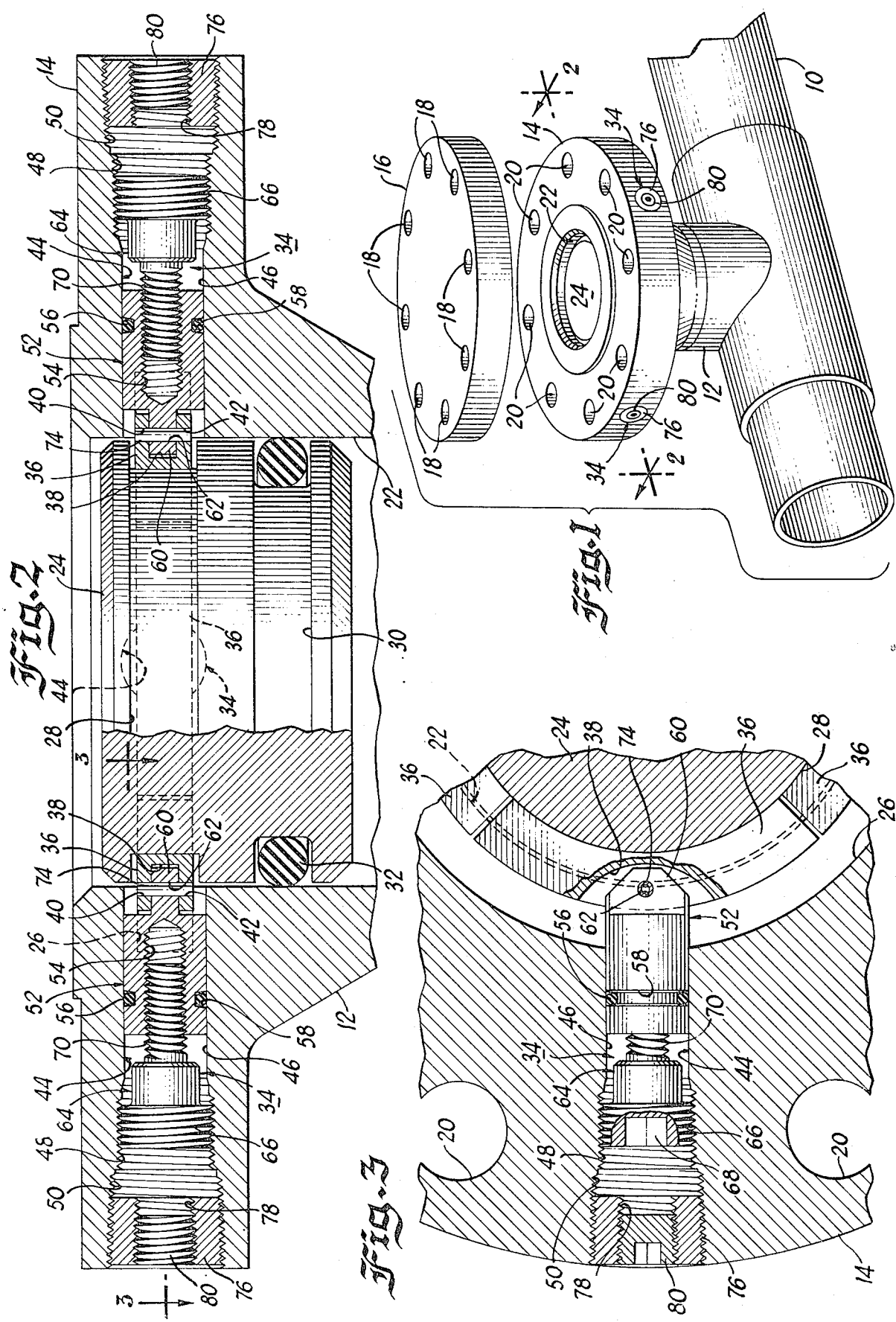

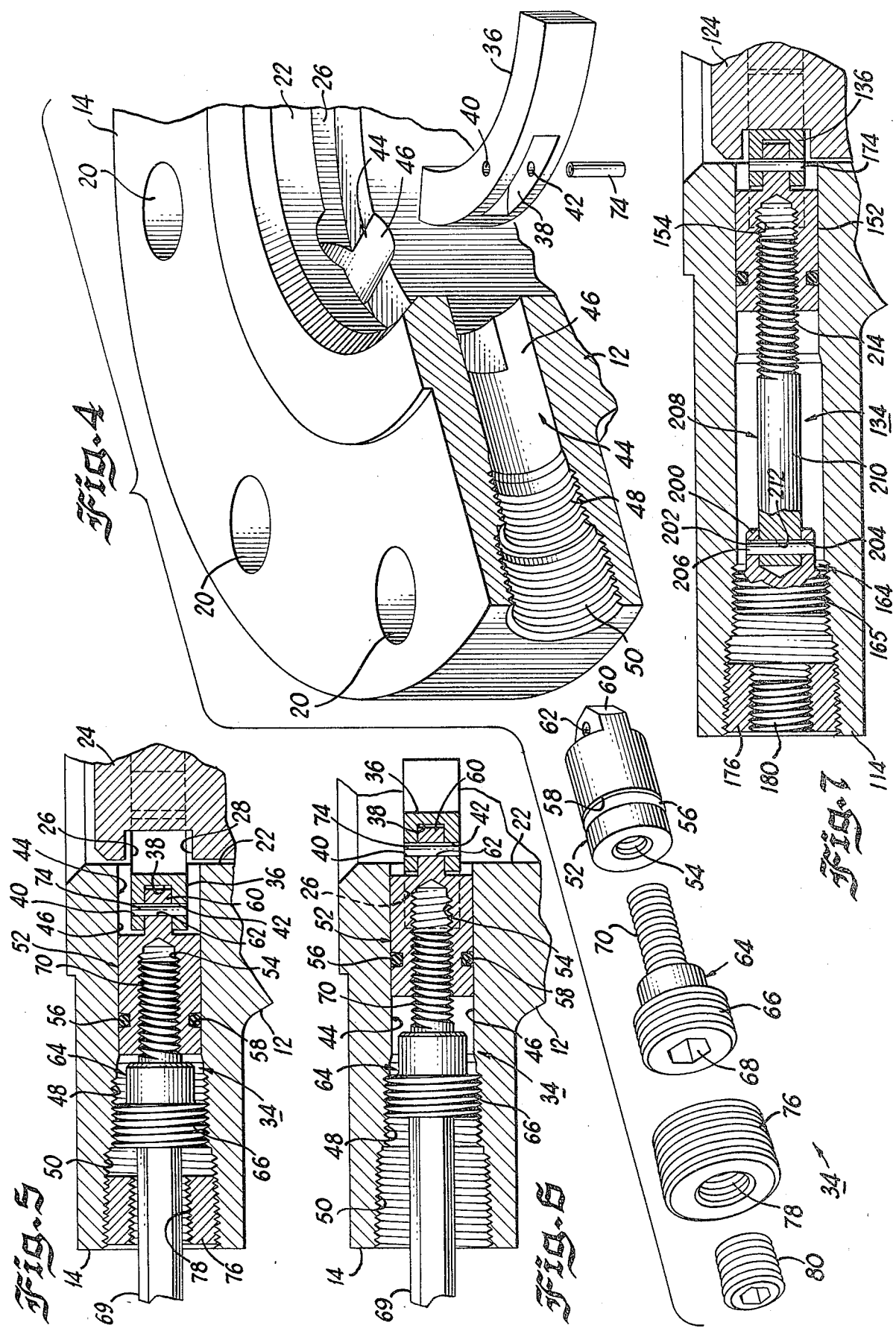

APPARATUS FOR PLUGGING A PRESSURE PIPING SYSTEM

BACKGROUND OF THE INVENTION

1. Field of the Invention

The present invention generally relates to a new and improved apparatus for plugging a pressure piping system and to a new and improved method of securing the plug and supporting structure within the piping system.

2. Description of the Prior Art

Hot tapping a piping system involves cutting a hole in a filled or pressurized pipe, tank, container or pressure vessel without loss of material inside or depressurization. Hot tapping may be known by other names such as pressure tapping, wet tapping, side cutting and the like depending on the industry or location, but regardless of what the method is called, this process allows new lines and systems to be tied into those that are existing and pressurized. It also permits under pressure instrument insertion, on-stream bypass installation, re-routing, and line plugging.

Hot tapping is normally accomplished by surrounding a portion of the pipe or vessel by a pressure tight flange or fitting containing a cutting tool and cutting the pipe or vessel wall by machining or abrasion action. Connections may then be made to the flange or fitting to provide temporary or permanent bypasses around or taps to the line or vessel. The cutting tool is then removed and the connection between the cutting tool and flange or vessel is plugged. If the tap or bypass is a temporary one, the connection between the tap or bypass is also plugged upon removal of the temporary tap or bypass. The hot tapping and subsequent line plugging described above is used, for example, when working on a system and installing control.

In plugging a line after a basic hot tap, a plug is inserted into the flange or fitting and held in position by a variety of supporting structures. These supporting structures are important in that they maintain the plug in position under substantial pressure. In addition, the supporting structures must also allow the plug to be easily installed and removed without damage to any of the structure, and minimize the possibility of failure under long term exposure to pressure within the piping system.

One prior art method of mounting a plug within a piping system employs a threaded bore extending through the flange of the piping system and a retaining device. The retaining device includes a threaded actuator extending through the threaded bore. The actuator has a T-shaped head that mounts in a T-shaped slot in a movable segment that engages a groove in the plug. An O-ring is positioned about the actuator to prevent leaks. The above-described prior art system requires a rather long, threaded hole or bore to be machined into the flange, and such a hole or bore is difficult to clean and to maintain.

Also, in such a prior art retaining device, the entire actuator must be rotated in order to bring the segment into engagement with the plug. Therefore, the ring around the actuator is also rotated, and is worn when such rotation occurs. The prior art device is also susceptible to possible damage to the O-ring during installation, which could result in eventual deterioration and failure of the O-ring. This prior art system also requires some means for retaining the segments in place when they are extended in the absence of a plug. This is generally accomplished by drilling holes through the flange and mounting bolts therein to limit the travel of the segment, a process which is time consuming and costly. In addition, such prior art systems only accommodate a specific size flange and plug thus, requiring complete new assemblies for variation in plug size and flange size.

SUMMARY OF THE INVENTION

An object of the present invention is to provide a new and improved assembly for holding a plug in a pressurized piping system.

Another object of the present invention is to provide a new and improved method for installing an assembly for holding a plug in a pressurized system.

A further object of the present invention is to provide a new and improved apparatus for plugging a piping system that may be easily installed without damage to the assembly.

A still further object of the present invention is to provide a new and improved apparatus for securing a plug within a pressurized piping system wherein the assembly is adjustable to accommodate systems of different sizes.

The present invention is directed to a new and improved apparatus for securing a plug in a piping system after a hot tapping or similar operation has been performed. The apparatus includes one or more segments that are mounted within the system, which upon positioning, engage the plug and hold it in position. The segment is engaged by a segment engaging member or plunger that is slideably mounted within a bore defined in the system. One end of the segment engaging member is positioned within a channel defined in the segment and is secured therein by a pin or similar device.

An actuator is threadably mounted within the system and includes a threaded stud connected to or integrally formed with the actuator and threadingly affixed to the segment engaging member. The actuator and the stud are threaded in opposite directions such that upon rotation of the actuator within the threaded mounting in the system, the stud is threaded into the segment engaging member or plunger and causes the member or plunger to slide within the bore without rotating to adjust the position of the segment. The actuator is prevented from backing up out of the bore by a bushing that is threaded into the end of the bore, and the entire bore is closed off from debris and tampering by a plug that is threaded into the bushing.

BRIEF DESCRIPTION OF THE DRAWING

The above and other objects and advantages and novel features of the present invention will become apparent from the following detailed description of the preferred embodiments of the invention illustrated in the accompanying drawings wherein:

FIG. 1 is a perspective view of a piping system including a plug and a holding assembly constructed in accordance with the principles of the present invention;

FIG. 2 is an enlarged sectional view taken along line 2—2 of FIG. 1;

FIG. 3 is a sectional view taken along line 3—3 of FIG. 2;

FIG. 4 is an enlarged, exploded view of a flange of a piping system and an apparatus constructed in accordance with the principles of the present invention;

FIG. 5 is a partial cross-sectional view of the apparatus of the present invention showing the position of the retaining apparatus when the plug is unsecured;

FIG. 6 is a view similar to FIG. 5 showing the position of the retaining apparatus when the plug is secured; and FIG. 7 is a cross-sectional view of an alternative embodiment of the present invention.

DETAILED DESCRIPTION OF THE PREFERRED EMBODIMENT

Referring initially to FIGS. 1-6, there is illustrated a pressurized piping system or pipeline 10 to which has been secured a nipple 12 with a flange 14 defined thereon. The apparatus of the present invention is intended to secure a plug within the flange to plug off the pipeline 10 either after a hot tapping operation or for other reasons such as installing a bypass, relocation of a three way fitting or similar procedures. Once the line has been plugged, a cover member 16 may be secured to the flange 14 by a plurality of bolts (not shown) passing through apertures 18 in the cover member 16 and through aperture 20 in the flange 14.

The flange 14 includes an opening or passage 22 within which a plug 24 is to be secured by the apparatus of the present invention. The plug 24 contains the high pressure fluid passing through the pipeline 10. The flange 14 has a beveled opening 22 and a circumferential groove or channel 26 defined therein. The circumferential groove or channel 26 is intended to be aligned with a circumferential groove or channel 28 defined in the plug 24. The plug 24 also includes a second channel 30 within which an O-ring 32 is positioned to provide a sealing effect.

Due to the high pressure of the fluid typically found in the piping system such as the pipe line 10, it is necessary that the plug 24 be securely positioned within the opening 22 in a manner to resist movement under the high pressures exerted on the lower surface of the plug 24. To maintain the plug 24 within the opening 22, a retaining assembly or apparatus generally designated by the reference numeral 34 is provided. The retaining assembly 34 includes one or more curvilinear segments 36 that are dimensioned to be easily retracted into the channel 26 defined in the flange 14 and to fit within the channel 28 defined in the plug 24 when extended. The number and size of the segments 36 is dependent on size of the plug 24 and the pressure of the fluid in the system. Four is a typical number of segments 36 employed; however, a greater or lesser number may be employed depending on the size and pressure of the system.

Each segment 36 includes a machined slot or channel 38 that is intersected at the upper and lower surface ends thereof by apertures 40 and 42. A number of bores generally designated by the reference numeral 44 and equal in number to the number of segments are machined or otherwise formed in the flange 14 around the circumference thereof, each positioned at a location aligned with the channels 38 of one of the segments 36. Each bore 44 includes at a forward end at a location intersecting the channel 38, a smooth section 46. Spaced from the smooth portion 46 of the bore 44 is a threaded portion 48, and spaced from the threaded portion 48 is a larger diameter threaded portion 50.

A retaining assembly 34 is contained within each bore 44 and includes a segment engaging member or plunger 52 having an internally threaded bore 54 defined therein. The outer peripheral surface of the plunger 52, in the preferred embodiment, is cylindrical and includes a groove 45 within which carries an O-ring 58. The O-ring 58 functions as a seal between the portion 46 of the bore 44 and the plunger 52. The plunger 52 includes a forward portion 60 that has vertical dimension approximately equal to the vertical dimension of the channel 38 to permit the forward portion 60 to be inserted into the channel 38. In addition, the forward portion 60 includes a vertical aperture 62 that is intended to be aligned with the apertures 40 and 42 of the segment 36 upon assembly of the retaining assembly 34.

In accordance with an important aspect of the invention, the retaining assembly 34 includes an actuator generally designated by the reference numeral 64. The actuator 64 includes an actuator body portion 66 that is externally threaded to match the threaded portion 48 in the bore 44 and a threaded stud portion 70, with the body portion 66 and stud portion 70 being threaded in opposite directions. The actuator body portion 66 is provided at the rear end thereof with a multi-sided aperture 68 within which a tool 69 may be inserted in order to thread the actuator 62 into the threaded portion 48 of the bore 44; however, although a multi-sided aperture 60 is illustrated, it should be understood that any suitable mechanism for imparting a rotating motion to the actuator 64 may be used.

To assemble the retaining assembly 34, the stud portion 70 is partly threaded into the plunger 52 and the body portion 66 is threaded into the threaded portion 48 until it bottoms. If necessary, the plunger 52 is then rotated until it extends sufficiently beyond the flange to permit the segment 36 to be placed over the forward portion 60 with the apertures 40, 42 and 62 in alignment. A pin 74 is then placed through the apertures 40, 42 and 62 and the actuator 64 is rotated in the opposite direction to retract the segment 36. A bushing 76 is threaded into the threaded portion 50 of the bore 44 as a safety measure in order to prevent the retaining assembly 34 from being blown out of the bore 44 in the event of a failure of one of the components of the assembly 34 or an inordinate increase in pressure in the pipe 10. A plug 80 is threaded into the bushing 76 to prevent access to the actuator 64 and the entry of debris into the bore 44. Alternatively, the bushing 76 may be made thinner, and a larger diameter plug (not shown) may be threaded or otherwise secured directly to the outer portion of the bore 44.

The retaining assembly 134 illustrated in FIG. 7 employs a segment 136 affixed to a plunger 152 by a pin 174. These elements are similar to the corresponding elements described in the embodiment illustrated in FIGS. 1-6, and function to hold a plug 124 in a flange 114 wherein the plug 124 is similar to the plug 24 of the embodiment illustrated in FIGS. 1-6, but the flange 114 may be of a different size than the flange 14. The retaining assembly 134 also includes a bushing 176 and a plug 180 that are similar to the corresponding elements of the embodiment of FIGS. 1-6.

The actuator 164 of the retaining assembly 134, comprises a threaded body portion 165 and a stud 208. The body portion 165 includes a forwardly extending flange 200 including upper 202 and lower 204 apertures that accommodate a pin 206. The pin 206 is employed to secure the stud 208 to the actuator 164. More specifically, the stud 208 includes an unthreaded portion 210 with an aperture 212 defined at one end thereof. As in the case of the embodiment illustrated in FIGS. 1-6, the stud 208 also includes a threaded end 214 that extends into the threaded aperture 154 of the plunger 152, and in this regard, functions the same as the stud 70 of FIGS. 1-6. The stud 208 is secured to the actuator 164 by alignment of the apertures 202, 204 and 212 and the insertion of the pin 206 therethrough. An advantage of utilizing a separate stud such as the stud 208 is that an installer in the field may select a stud 208 of a length suitable for a particular size flange and attach the appropriate length stud 208 to the actuator 164. Thus, various size flanges may be accommodated while carrying a minimum number of different specialized parts.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for securing a plug within a pressurized piping system comprising:
    a segment for holding a plug in position in said piping system;
    a segment engaging element coupled to said segment and slidably mounted in said piping system for engaging and locking said segment in position relative to said piping system; and
    an actuating member having threads formed thereon threadedly mounted in said piping system for slidingly actuating said segment engaging member for moving said segment into and out of engagement with said plug, said actuating member having a first set of threads engaging said piping system and a second set of threads engaging said segment engaging element, said first and second sets of threads being threaded in opposite directions and cooperating to move said segment engaging element a distance greater than the distance moved by the actuating member upon rotation thereof.

2. The apparatus claimed in claim 1 further comprising a back-up preventing means mounted in said system for preventing backing-up of said segment engaging element and said actuating member.

3. The apparatus recited in claims 1 or 2 further comprising means including a cover member affixed to said piping system for covering access to said actuating member.

4. The apparatus claimed in claim 1 wherein said segment is curvilinear and includes a slot defined therein in which said segment engaging element is mounted for locking said segment in position.

5. The apparatus claimed in claim 1 further comprising means for locking said segment to said segment engaging element.

6. The apparatus claimed in claim 1 comprising a stud releasably attached to said actuating member, said stud including threads for securing to and actuating said segment engagement element, said threads on said stud being opposite to threads on said actuating member.

7. The apparatus claimed in claim 1 wherein said actuating member is selectively threadable between a segment extended position wherein said segment is fully extended into said piping system and a segment retracted position wherein said segment is fully retracted from said piping system, said apparatus including means for engaging said actuating member for limiting the travel thereof to prevent said actuating member from being threaded beyond said segment extended position for maintaining said second set of threads in engagement with said segment engaging element when said actuating member is in the first segment extended position to prevent said segment and said segment engaging member from falling into said piping system.

8. In a piping system comprising a pipe line, a flange on said pipe line, an opening in said flange in fluid communication with said pipe line, and a plug to be secured in said opening, a plug retaining assembly including at least one segment for engaging the plug, a plunger coupled to said segment and slidably mounted in said flange, a stud threadedly engaging said plunger, and an actuator threadedly mounted in said flange and mechanically coupled to said stud for rotation therewith, said stud having threads threaded in one direction and said actuator having threads threaded in the opposite direction, said oppositely threaded threads cooperating to provide relative motion between said actuator and said plunger, said actuator being threadable into said flange to an innermost position, said flange including means for engaging said actuator for preventing inward movement of said actuator beyond said innermost position, said stud maintaining engagement with said plunger when said actuator is positioned in the innermost position to prevent said segment from falling into said piping system.

9. The system set forth in claim 8 wherein said stud is integral with said actuator.

10. The system set forth in claim 8 wherein said stud is removably coupled to said actuator.

11. The system set forth in claim 8 wherein said segment and said plunger are coupled together by a pin.

12. The system set forth in claim 8 further comprising a bushing and a plug threadedly mounted in said flange.

13. An apparatus for securing a plug within a flange of a piping system wherein said plug and said flange each include a channel defined therein, said apparatus comprising:
    at least one curvilinear segment of a predetermined size to allow positioning thereof in either said plug channel or said flange channel;
    at least one radial bore defined in said flange;
    a plunger slidably mounted in said bore;
    means for securing said plunger to said segment;
    a stud including threads adapted to be threaded into said plunger; and
    a threaded actuator threadedly mounted in said bore and coupled to said stud, said stud having threads threaded in one direction and said actuator having threads threaded in said opposite direction, said oppositely threaded threads cooperating to slide said plunger radially within said bore a distance greater than the radial distance moved by said actuator upon rotation thereof, said actuator being threadable into said bore to an innermost position, said flange including means for engaging said actuator for preventing inward movement of said actuator beyond said innermost position, said stud maintaining engagement with said plunger even when said actuator is positioned in the innermost position for preventing said plunger and said segment from falling into said piping system.

14. The apparatus set forth in claim 13 wherein said segment includes a slot and a portion of said plunger extends into said slot.

15. The apparatus set forth in claim 14 further including a retaining pin extending through said slot in said segment and through said portion of said plunger.

16. The apparatus set forth in claim 13 further comprising a bushing threadedly mounted in said bore.

17. The apparatus set forth in claim 13 further comprising a plug threadably mounted in said bore.

18. Apparatus for retaining a plug within a piping system, the piping system having a bore extending therethrough into the interior thereof, the bore having an unthreaded portion having inner and outer ends, the inner end being in fluid communication with said piping system, and a threaded portion in communication with the outer end of said unthreaded portion, said apparatus comprising:

an actuator having first and second threaded portions threaded in opposite directions, said first threaded portion engaging the threaded portion of said bore, said actuator being movable between an extended position and a retracted position upon rotation thereof;

means for engaging said actuator when said actuator is in said extended portion for preventing the movement of said actuator beyond said extended position;

a plunger slidingly disposed within the unthreaded portion of said bore, said plunger having a threaded section engaging the second threaded portion of said actuator, said oppositely threaded portions cooperating to slide said plunger a distance greater than the distance between the extended and retracted positions of said actuator, said second threaded portion of said threaded section being maintained in engagement even when said actuator is positioned in its extended position to prevent said plunger from falling into said piping system; and a plug engaging segment connected to said plunger, said segment being movable by said plunger into and out of engagement with said plug upon movement of said actuator between said extended and retracted positions.

19. Apparatus as recited in claim 18 wherein said segment is movable between an extended position and a retracted position upon movement of said actuator between the extended and retracted positions thereof, respectively, the distance between the extended and retracted positions of said segment being greater than the distance between said extended and retracted positions of said actuator.

20. Apparatus as recited in claim 19 wherein said unthreaded portion of said bore has a smaller diameter than the diameter of the threaded portion of said bore, wherein the smaller diameter of the unthreaded portion of said bore operates as the actuator engaging and movement preventing means.

21. Apparatus as recited in claim 20 wherein said actuator has a body portion and a stud extending therefrom, the first threaded portion being formed on said body portion, and the second threaded portion being formed on said stud.

22. Apparatus as recited in claim 18 wherein said first threaded portion of said actuator is threaded in the right-hand direction and the second threaded portion is threaded in the left-hand direction.

23. Apparatus as recited in claim 18 further including a pin connecting said plug engaging member to said plunger.

* * * * *